Figure 1:
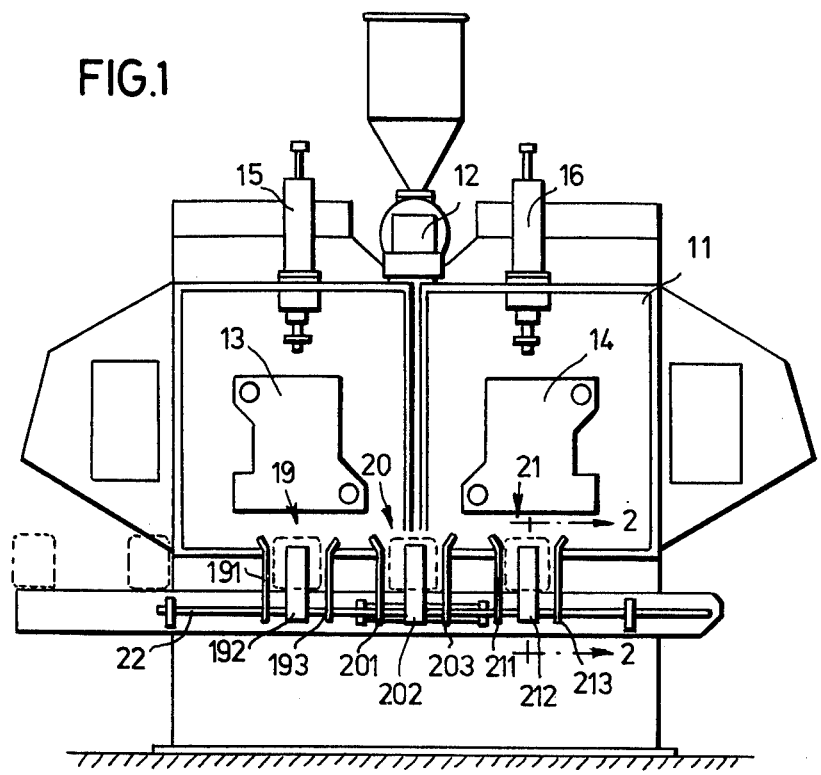

United States Patent [19]

Fischer et al.

[11] 4,125,583

[45] Nov. 14, 1978

[54] METHOD FOR THE FURTHER CONVEYING OF THE HOLLOW ARTICLES EJECTED BY HOLLOW ARTICLE BLOW-MOULDING MACHINES

[76] Inventors: Stefan Fischer, Im Korresgarten 21, Lohmar; Helmut Scharrenbroich, Neuenhaus 21, Neunkirchen-Seelscheid, both of Fed. Rep. of Germany

[21] Appl. No.: 773,146

[22] Filed: Mar. 1, 1977

Related U.S. Application Data

[63] Continuation of Ser. No. 471,582, May 20, 1974, abandoned.

[30] Foreign Application Priority Data

May 18, 1973 [DE] Fed. Rep. of Germany ....... 2325283

[51] Int. Cl.² ............................................. B29C 17/07
[52] U.S. Cl. ...................................... 264/98; 198/448; 198/451; 198/740; 214/1 BB; 264/297; 425/537; 425/538
[58] Field of Search ....................... 214/1 BB; 209/98; 264/89, 90, 92, 94, 96–99, 297; 425/532, 537, 538; 198/448, 451, 740

[56] References Cited

U.S. PATENT DOCUMENTS

| | | | |
|---|---|---|---|
| 3,447,680 | 6/1969 | Mehnert | 209/98 X |
| 3,708,052 | 1/1973 | Faure | 198/24 |
| 3,794,454 | 2/1974 | Higginbotham et al. | 425/538 X |
| 3,830,360 | 8/1974 | Graff et al. | 198/20 |
| 3,834,213 | 9/1974 | Henzler et al. | 214/1 BB X |
| 3,860,375 | 1/1975 | Kinslow, Jr. et al. | 425/532 X |

FOREIGN PATENT DOCUMENTS 979,088  1/1965  United Kingdom ..................... 198/448

Primary Examiner—Jan H. Silbaugh

[57] ABSTRACT

An article moulding and conveying method including alternately extruding parisons and alternately blow-moulding articles from the extruded parisons and thereafter delivering the blow-moulded articles alternately and at different times along parallel paths directly after being blow moulded to two stationary constantly spaced points of deposit along a predetermined path of article travel, the two constantly spaced points defining a first predetermined distance between each other, intermittently moving deposited articles as a constantly spaced group at a time between the alternate delivery of any two successively delivered blow-moulded articles, the intermittent movement being in a first direction along the predetermined path of article travel a second distance, and the first predetermined distance being an even numbered multiple of the second distance.

6 Claims, 2 Drawing Figures

U.S. Patent     Nov. 14, 1978     4,125,583

METHOD FOR THE FURTHER CONVEYING OF THE HOLLOW ARTICLES EJECTED BY HOLLOW ARTICLE BLOW-MOULDING MACHINES

This is a continuation of application Ser. No. 471,582 filed on May 20, 1974 now abandoned.

This invention relates to a method and an apparatus for the further conveying of the hollow articles ejected by hollow article blow-moulding machines and the like synthetic plastics processing machines, to subsequently placed apparatus in which for example finishing work is to be carried out on the completed articles. Above all the invention relates to apparatus of the stated kind capable of further conveying the hollow articles which are ejected at two mutually spaced positions of the blow machine, if the latter works for example with two blow moulds which are bringable alternately in the working cadence to an extrusion head, whence they are movable back into the respective blowing station in which after the inflation of the blank they liberate the finished articles which drop on to one common conveyor track on which they are moved forward in the same direction.

In the known apparatuses of the stated kind, for the further conveying of the ejected articles ordinarily conveyor channels, conveyor belts or the like devices are used on to which the articles are dropped or ejected from the opened moulds. Then they are moved forward by special conveyor elements or the belt itself, in which operation it can easily occur that they tilt out of the intended position into another position and then cannot be taken up by the finishing apparatus. In this case special difficulties also arise due to the fact that the finished articles drop or are ejected on to the same conveyor track, so that it can easily occur that the ejected article drops on to an article already previously ejected.

These drawbacks and difficulties are to be eliminated by the invention and a method and an apparatus are to be produced which serve for the further conveying to the subsequently placed devices of the hollow articles ejected by a hollow article blow-moulding machine having at least two moulds, which articles drop on to one common conveying track, this method and apparatus ensuring secure further conveying and placing ready in a predetermined position with cheap means and simple components.

For this purpose, in a method for the further conveying of the articles ejected by a hollow article blow-moulding machine having at least two ejection stations for the finished hollow articles, which articles drop on to a common conveying track on which they are moved forward in the same direction, the invention provides that the ejected articles are moved forward intermittently on the conveying track in the working cadence of the machine by a distance the even-numbered multiple of which corresponds to the interval between the ejection stations of the articles. Furthermore in an apparatus for the further conveying to subsequently placed devices of articles ejected by a hollow article blow-moulding machine or the like synthetic plastics processing machine having at least two moulds, which apparatus possesses a conveying track arranged beneath the moulds on to which the articles drop at positions lying spaced from one another, the invention further provides that with the conveying track there are associated conveying elements movable in the conveying direction which are advanceable intermittently in the working cadence of the machine and arranged at intervals one behind the other the even numbered multiple of which corresponds to the interval of the points of dropping of the articles on the conveying track. The conveying elements are expediently movable back and forth along the forward motion distance. Furthermore the conveying elements should expediently be formed as catching elements for the ejected articles, so that it is ensured that these assume a predetermined position on the conveying track.

If the conveying track is made in angular form with a lower carrier rail and a fixed side rail the conveying elements can be made as cassettes which are open towards the carrier rail and the side rail and preferably widen in funnel shape at their upper edge to form catching elements. These catching cassettes are expediently arranged on a common carrier which is movable along a guide rail in the conveying direction over the forward motion distance and after movement out of the conveying direction is returnable again and movable into the conveying direction. For the movement of the forward motion cassettes out of the conveying direction the carrier can expediently be made for pivoting through an adequate angle about its guide rail.

Figure 2:
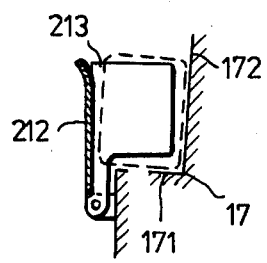

The invention permits of many possibilities of embodiment. The invention will be better understood from the following description of a form of embodiment of an apparatus suitable for carrying out the method in accordance with the invention which is illustrated by way of example with the parts essential to understanding in the accompanying drawing, wherein:

FIG. 1 shows a hollow article blow-moulding machine with the apparatus according to the invention in elevation and FIG. 2 shows a section approximately along the line 2—2 in FIG. 1, somewhat diagrammatically.

In FIG. 1 of the drawing a hollow article blow-moulding machine 11 is indicated which charges two blow moulds 13 and 14, which are bringable alternately in the working cadence of the machine to the extrusion head, with pre-mouldings from an extrusion head 12. After the reception of a pre-moulding the blow moulds 13 and 14 move into the respective blowing stations 15 and 16 where the pre-moulding is blown to form the finished article. Then the two moulds open alternately and drop the moulded articles on to a conveying track 17 arranged thereunder.

As may be seen from FIG. 2, this conveying track is formed essentially by an angle rail 17 which can be firmly connected with the machine frame and possibly slightly inclined. The ejected article, indicated in chain lines in the drawing, drops on to the lower carrier rail 171 and in doing so leans against the rear side rail 172. Associated with the guide rail 17 are three catching and forward motion cassettes 19, 20, 21 which are formed each by three side walls 191, 192, 193 and 201, 202, 203 and 211, 212, 213 respectively which are arranged on a guide rail 22 serving as common carrier. The cassettes 19, 20, 21 are movable back and forth in the conveying direction together with the rail 22, at the same time being pivotable about the axis of the guide rail. Thus the articles which are situated in the cassettes can be advanced by a distance, then the cassettes can be pivoted out of the conveying direction and then returned into the initial position, whereupon they are again pivoted into the conveying direction in order to be able to catch the next article and then advance it. The forward motion distance corresponds to the interval of the cassettes from one another, which is equal to half the interval of the blow moulds situated in the blowing position. An even numbered multiple of the forward motion distance or of the interval of the cassettes thus corresponds to the interval of the ejection stations of the articles.

These measures ensure that whenever an article is ejected from the mould 13 past which the articles ejected from the mould 14 must be conducted, no article is situated in the catching and forward motion cassette 19 situated beneath this mould. Furthermore the apparatus according to the invention makes the articles to be conveyed ready for the subsequent apparatus individually in a precisely defined position, so that correct takeover is ensured.

What we claim is:

1. An article moulding and conveying method comprising the steps of alternately extruding parisons and alternately blow-moulding articles from the extruded parisons, delivering the blow-moulded articles alternately and at different times along parallel paths directly after being blow moulded to two stationary constantly spaced points of deposit along a predetermined path of article travel, said two constantly spaced points defining a first predetermined distance between each other, intermittently moving deposited articles as a constantly spaced group at a time between the alternate delivery of any two successively delivered blow-moulded articles, the intermittent movement being in a first direction along the predetermined path of article travel a second distance, and the first predetermined distance being an even numbered multiple of the second distance.

2. The article moulding and conveying method as defined in claim 1 wherein the intermittent movement of the deposited articles in the first direction is performed by a plurality of pusher elements, and following movement of the pusher elements in the first direction is performed the step of pivoting the plurality of pusher elements transversely at and out of the predetermined path of article travel.

3. The article moulding and conveying method as defined in claim 2 wherein said pusher elements are at least three in number, and the distance between each adjacent pair of the pusher elements is one-half the distance between said two constantly spaced points.

4. The article moulding and conveying method as defined in claim 2 wherein following the pivoting step there is performed the steps of moving the plurality of pusher elements in a second direction opposite said first direction followed by the pivoting of the plurality of pusher elements transversely of and into the predetermined path of article travel.

5. The article moulding and conveying method as claimed in claim 1 wherein the alternate delivery of the blow-moulded articles is preformed by the alternate delivery of the blow-moulded articles along second and third predetermined paths disposed transversely of and generally normal to said first-mentioned predetermined path of article travel.

6. The article moulding and conveying method as defined in claim 1 wherein the alternate delivery of the articles is performed by the alternate delivery of the articles along second and third predetermined paths disposed vertically, transversely and generally normal to said first-mentioned predetermined path of article travel.

* * * * *